US006805032B2

(12) United States Patent
Engdahl

(10) Patent No.: US 6,805,032 B2
(45) Date of Patent: Oct. 19, 2004

(54) CUTTING DEVICE FOR FRUITS AND VEGETABLES, PREFERABLY ONION

(75) Inventor: Benny Engdahl, Upplands Väsby (SE)

(73) Assignee: Europeisk Produktutveckling AB, Upplands Väsby (SE)

( * ) Notice: Subject to any disclaimer, the term of this patent is extended or adjusted under 35 U.S.C. 154(b) by 0 days.

(21) Appl. No.: 10/467,004

(22) PCT Filed: Feb. 1, 2002

(86) PCT No.: PCT/SE02/00182

§ 371 (c)(1),
(2), (4) Date: Aug. 1, 2003

(87) PCT Pub. No.: WO02/064331

PCT Pub. Date: Aug. 22, 2002

(65) Prior Publication Data

US 2004/0055437 A1 Mar. 25, 2004

(30) Foreign Application Priority Data

Feb. 13, 2001 (SE) .............................................. 0100468

(51) Int. Cl.$^{7}$ ............................ B26D 5/08; B26D 1/12; A21C 5/00

(52) U.S. Cl. .............................. 83/597; 83/167; 30/114

(58) Field of Search ........................... 30/114, 115, 116, 30/117, 299, 303, 304; 83/167, 605, 597; 99/537

(56) References Cited

U.S. PATENT DOCUMENTS

| | | | | | |
|---|---|---|---|---|---|
| 1,379,724 | A | * | 5/1921 | Russell | 83/451 |
| 1,830,284 | A | | 11/1931 | Massa | |
| 2,219,963 | A | * | 10/1940 | Rieder | 83/167 |
| 2,735,467 | A | | 2/1956 | Hellmich | |
| 2,788,820 | A | | 4/1957 | Hellmich | |
| 4,100,676 | A | * | 7/1978 | Ferguson | 30/292 |
| 4,625,404 | A | * | 12/1986 | Valente et al. | 30/114 |
| 4,852,256 | A | * | 8/1989 | Schoettler | 30/114 |
| 5,245,902 | A | * | 9/1993 | Pereira | 83/435.19 |
| 6,148,704 | A | * | 11/2000 | Lewis | 83/167 |

FOREIGN PATENT DOCUMENTS

| | | |
|---|---|---|
| GB | 467356 | 6/1937 |

* cited by examiner

*Primary Examiner*—Hwei-Siu Payer
(74) *Attorney, Agent, or Firm*—Dickstein Shapiro Morin & Oshinsky LLP

(57) ABSTRACT

The invention relates to a cutting device for fruit and vegetables, preferably onions, and includes a cutting member (2) having intersecting knife blades (3, 4) or parallel knife blades (4) forming a grid, and a counter pad (5), against which the cutting member (2) can be pushed in the process cutting the onion (6) at issue. The counter pad (5) is constituted by a cutting-board (8) having a centrally located cutting member (2) and which via a joint in the shape of a hinge (7) is swingingly connected to the cutting-board (8) to allow the knife blade grid to carry out a swinging movement in the direction down towards the cutting edge and one onion (6) in position thereon. Within the area substantially coinciding with the area of the knife blade grid the cutting-board (8) exhibits a plurality of projections (9) supporting the onion (6) and intended to penetrate the openings or cavities (10) of the knife blade grid when the cutting member (2) is in a completely down-tilted position above the cutting-board (8).

4 Claims, 3 Drawing Sheets

CUTTING DEVICE FOR FRUITS AND VEGETABLES, PREFERABLY ONION

The present invention relates to a cutting device for fruit and vegetables, preferably onions, comprising a cutting member having intersecting or parallel knife blades forming a grid, and a counter pad against which the cutting member can be pushed thereby effecting a cutting up of the onion at issue.

The usual method today for cutting onions is to use a knife and at the same time hold the onion with the fingers of the one hand and successively moving it along the onion which is thereby cut up to slices. The fingertips are then used to hold and to displace the onion. Especially a person not experienced to this procedure can easily get his fingers cut. In the market there are also available a number of different mechanical devices for onion cutting but it has turned out that their production costs are high and that the handling and cleaning of them is difficult.

The object of the present invention is to provide a cutting device, particularly for onions, of a new type which does eliminate the above-mentioned drawbacks simultaneously facilitating the cutting approaches and making it convenient to perform. The features characterizing the invention are set out in the patent claims.

Thanks to the invention there has now been provided a cutting device for fruit and vegetables which is especially suitable for onion cutting and which in a very safe and simple way performs the cutting process. It has turned out that this cutting device does in an excellent manner satisfy its purposes and also that it can simply be manufactured at a low cost. Thanks to its simplicity the cutting device can also conveniently be dished and kept clean because it does consist of two parts only which are pivotably connected with each other by means of a hinge. The part of the device which is adapted to support the onion is constituted by a cutting-board which can be placed i.e. on a table. In this device the cutting member is pivotably mounted on the cutting-board so that when used it can perform a swinging movement down towards the cutting-board and to an onion placed thereon so that the latter can be sliced. To obtain a high quality cutting process the cutting-board exhibits a plurality of projections which are to support the onion properly and which penetrate the openings in the grid which the knife blades form. This occurs during the final phase of the cutting process, when the knife blades move pass the lower portion of the onion and penetrate into the grooves running between the projection whereby a complete cutting of the onion is achieved.

A preferred embodiment of the invention is described below with reference to the drawings FIG. 1 is a diagrammatic cross sectional lateral view showing a cutting device according to the invention which has its cutting member in an upper position and the onion to be cut placed on its support surface of the pad constituted by a cutting-board;

Figure 1:
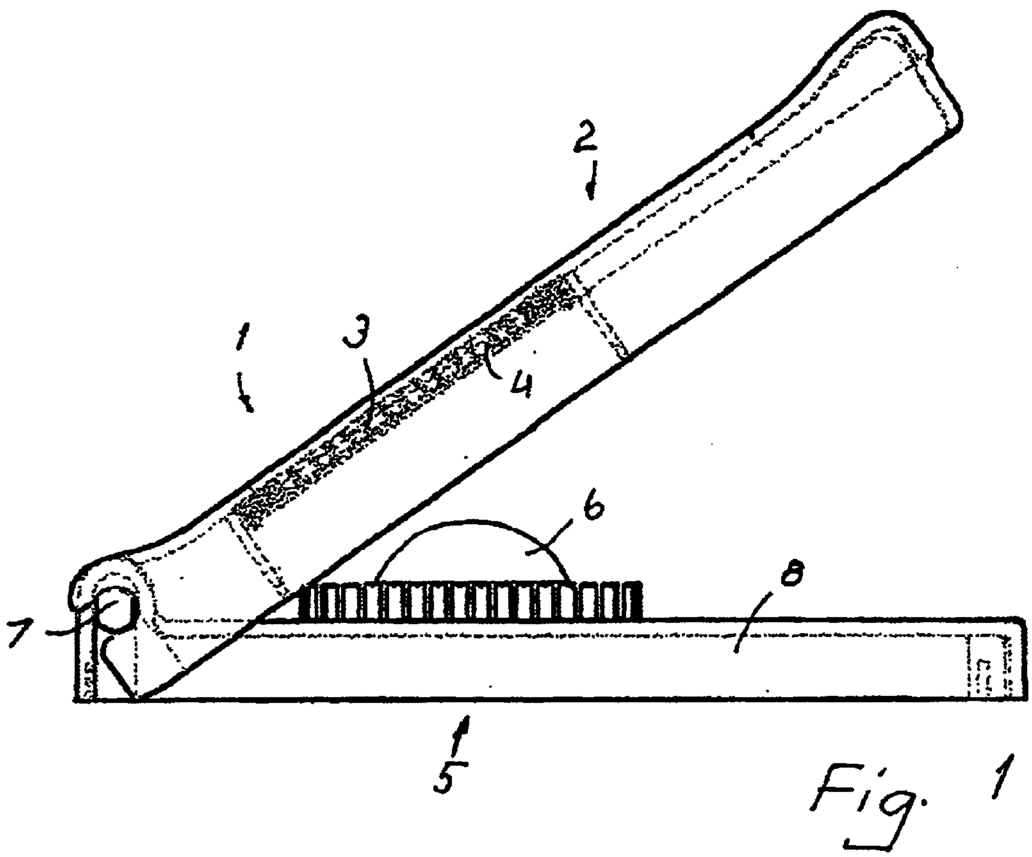
Figure 2:
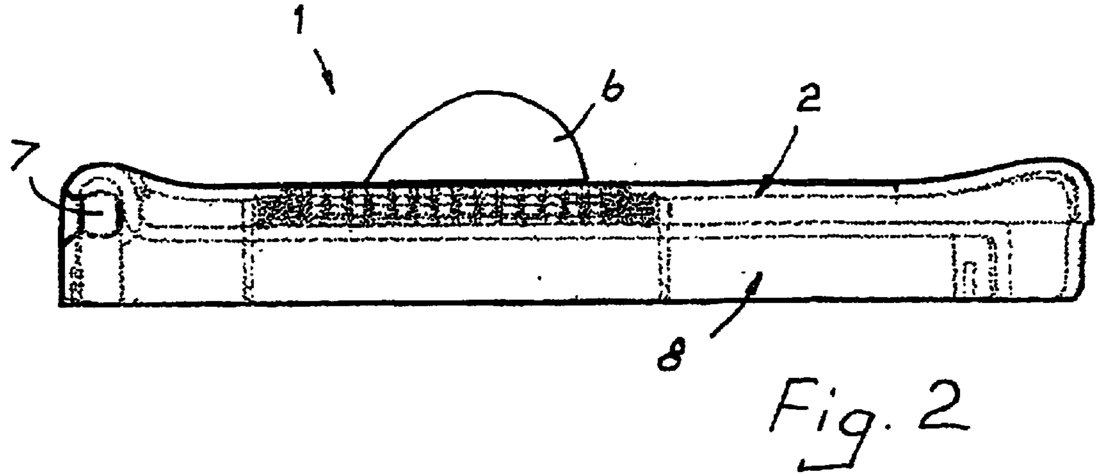
FIG. 2 is a diagrammatic cross sectional view of the cutting device shown in FIG. 1, as appearing when the cutting member has been pushed down into the onion and cut into pieces. The onion can then conveniently be pushed off the cutting-board.
Figure 3:
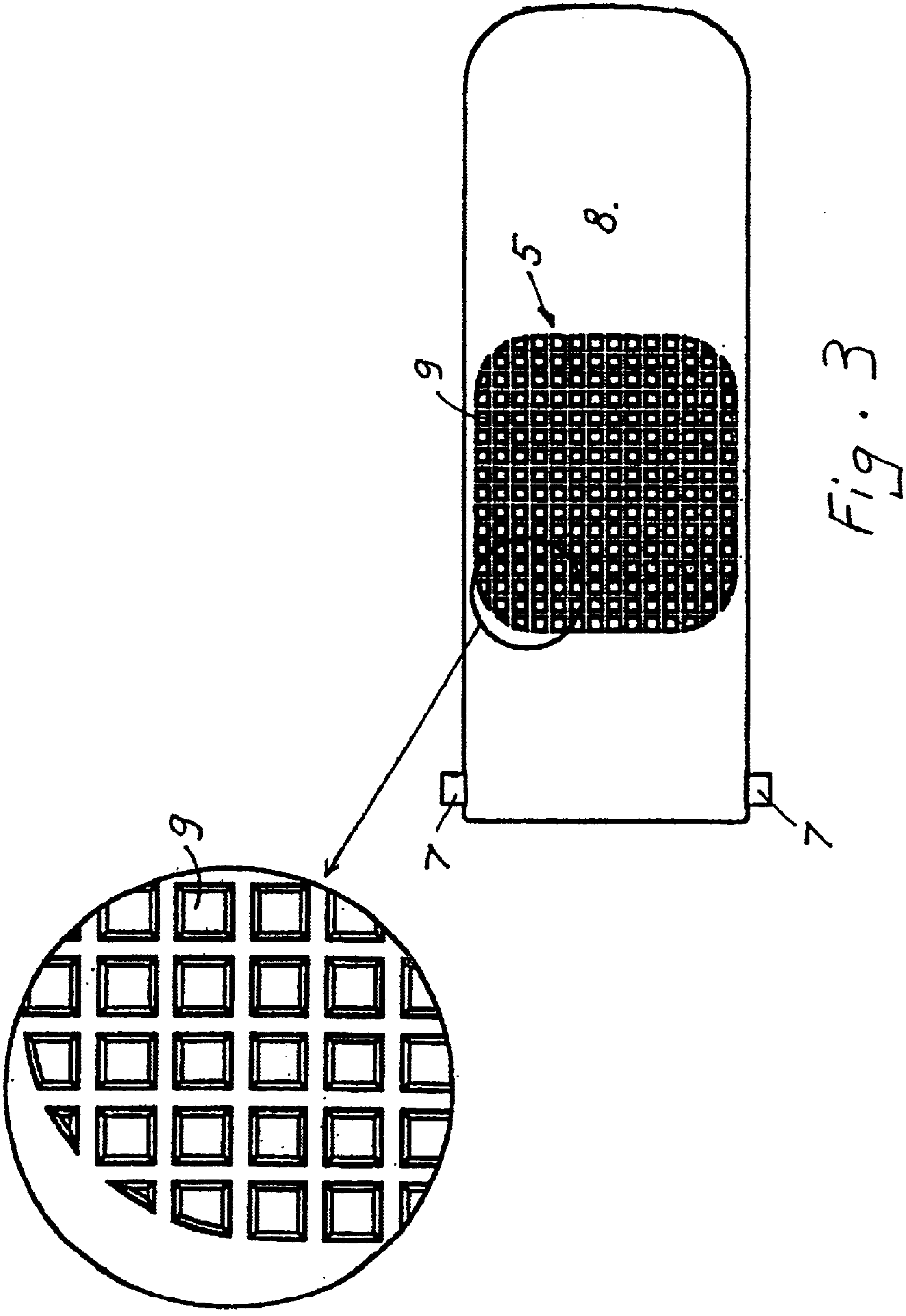
FIG. 3 is a top view illustrating the cutting-board including the area which shows as a counter pad and comprises the projections on which the onion is to be placed.
Figure 4:
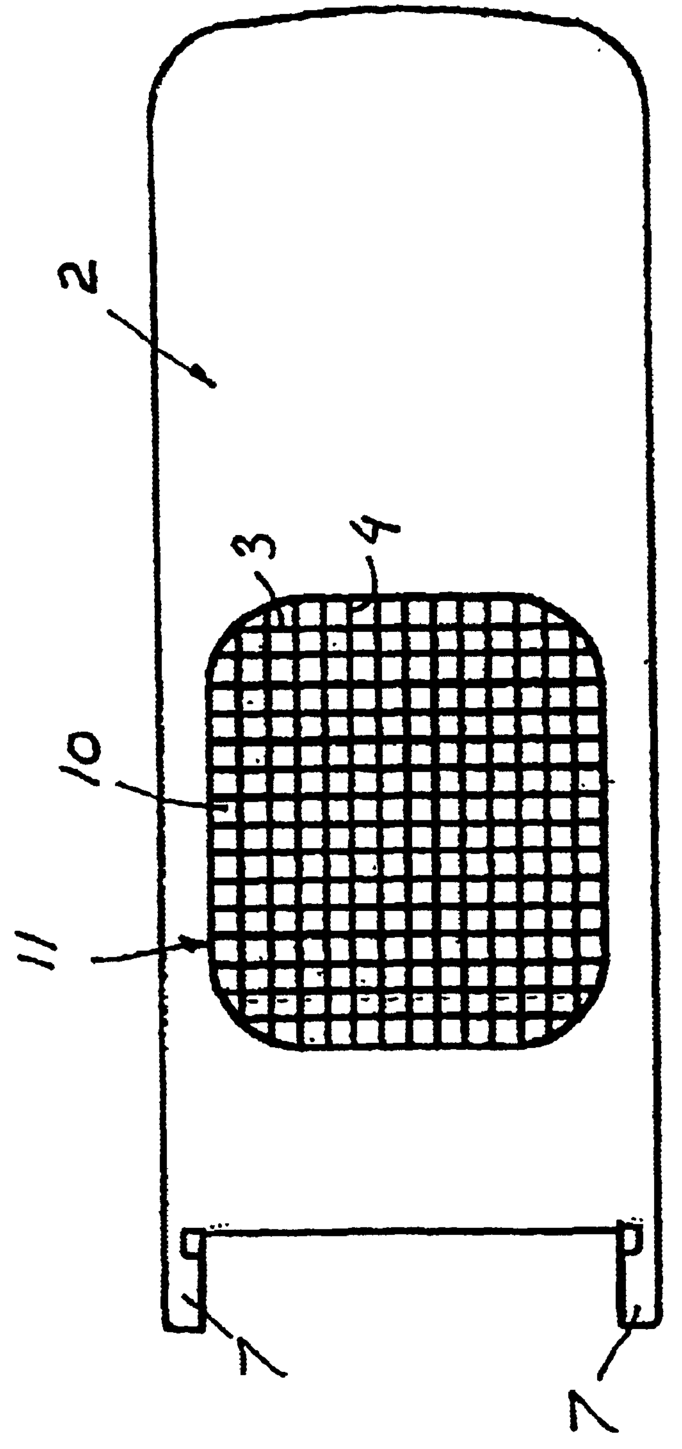
FIG. 4 is a diagrammatic top view of the cutting member.

As appears from the drawings this preferred embodiment of the invention is constituted by a cutting device 1 for vegetables or fruit, especially onions, the device comprising a cutting member 2 having knife blades 3, 4 intersecting each other or parallel to each other so as to form a grid. According to an alternative embodiment the knife blades are oriented so that they are parallel in one direction only. Irrespective of whether the knife blades 3, 4 cross each other or are parallel they are adapted to cooperate with a counter pad 5 when the cutting member 1 is pushed into the onion 6 for the purpose of cutting it into pieces.

The cutting device 1 has two main parts, namely the cutting member 2 proper and the above-mentioned counter pad 5. Those parts are pivotably interconnected via a hinge 7. The counter pad 5 is constituted by a cutting-board 8 which when used is to be placed on a flat table surface and to which the cutting member 2 is swingably connected via the hinge 7 to make it possible for the cutting member 2 to carry out a swinging movement downwards towards the cutting-board 8 and an onion 6 in position thereon.

When the cutting member 2 has been completely pushed down above the cutting-board 8 and the onion 6 resting thereon the onion will be completely divided thanks to the fact that the cutting-board 8 has a variability of projections 9 which extend out from the cutting-board 8 a distance substantially corresponding to the height of the knife blades 3, 4. When the cutting member 2 has completely penetrated the cutting-board 8 the upper portion of the knife blades 3, 4 are on the same level as the upper portions of the projections 9 and with the other portions of the cutting-board top surface so that a ready-cut onion conveniently can be pushed off the cutting-board 8 upon the cutting operation.

The projections 9 form a pattern which corresponds to that of the knife blades 3, 4 on the cutting member 2 and have a cross sectional shape substantially corresponding to the shape defined by the knife blades 3, 4 defining the openings or cavities 10 in the cutting member. The height of the knife blades 3, 4 in the cutting member 2 is slightly less than the height of the projections 9 whereby there is formed the above-mentioned flat surface when the cutting member 2 has been completely tilted down over the cutting-board 8.

The cutting member 2 is constituted by a board or plate having a through opening 11 in its central portion where the knifes 3, 4 form a grid in the shape of intersecting or parallel knifes the vertical extension of which roughly corresponds to the knife height on the cutting-board 8.

According to the preferred embodiment the knife blade grid acting as knifes 3, 4 have square openings or cavities 10 the size of which could be about 4×4 mm up to 6×6 mm, the height being around 4–10 mm.

According to an alternative embodiment the knifes 3, 4 can be of different height or width and their edge can exhibit saw teeth.

What is claimed is:

1. A device for cutting fruit and vegetables particularly onions, comprising a cutting member (2) with intersecting knife blades (3, 4) or parallel knife blades (4), forming a grid, and a counter pad (5) against which the cutting member (2) can be pushed, in the process of cutting the onion (6), said counter pad (5) being constituted by a cutting-board (8) exhibiting a centrally oriented cutting member (2) which by means of a joint in the shape of a hinge (7) is pivotably connected with the cutting-board (8) to allow its knife blade grid to carry out a swinging movement directed downwards to the cutting-board (8) and towards an onion (6) placed thereon, the cutting-board (8) having within the area, essentially coinciding with the extent of the knife blades, a plurality of projections supporting the onion (6), characterized in that the projections (9) form a pattern corresponding to the knife blades (3, 4) on the cutting member (2), and have cross sectional shape substantially corresponding to the shape defined by the knife blades (3, 4) on the cutting member (2), including openings or cavities (10), said projections (9) being intended completely to penetrate the openings or cavities (10) in the knife blade grid when the cutting member (2) is in its fully down-tilted position above the cutting-board (8), the height of the knife blades (3, 4) being slightly less than that of the projections (9) so that, when the cutting member (2) is in its down-tilted position, a flat surface is obtained.

2. A device according to claim 1, characterized in that the knifes (3, 4) have different broad dimensions and exhibit an edge having saw teeth.

3. A device according to claim 1, characterized in that the cutting member (2) is constituted by a board having in its central portion a through opening (10) in which the knife grid is located with a vertical extension substantially corresponding the height of the board or the thickness and height of the projections (9).

4. A device according to claim 1, characterized in that the knife blade grid exhibits square openings or cavities (10) the size of which is about 4×4 mm up to 6×6 mm, their height being around 4–10 mm.

* * * * *